No. 645,447.  
Patented Mar. 13, 1900.
J. W. ALLEN.
PARING AND SLICING KNIFE.
(Application filed Sept. 29, 1898. Renewed Oct. 16, 1899.)
(No Model.)
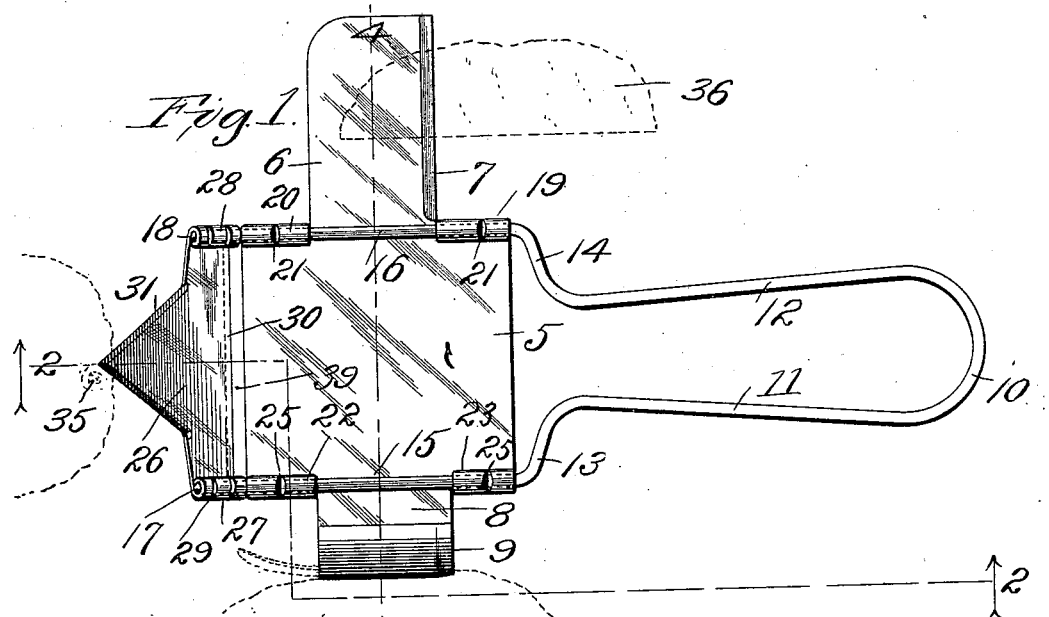
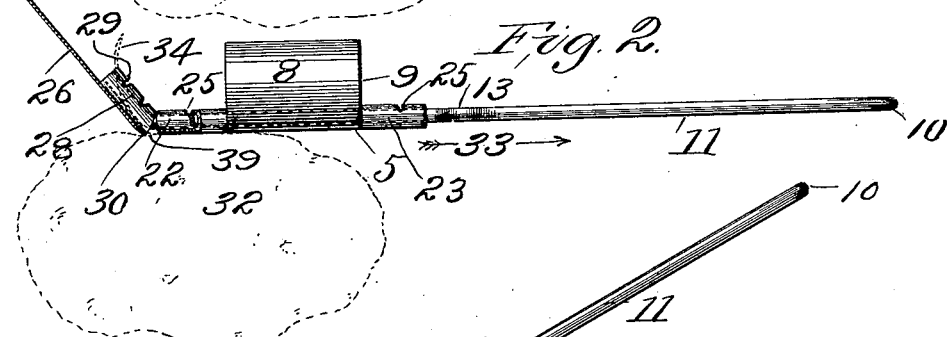
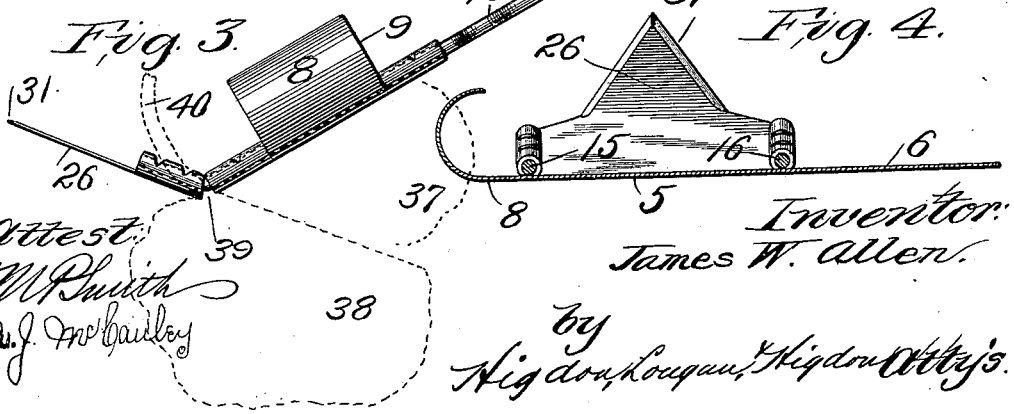
Attest:  
M. P. Smith  
A. J. McCauley
Inventor:  
James W. Allen.  
by Higdon, Longan & Higdon Atty's.

UNITED STATES PATENT OFFICE.

JAMES W. ALLEN, OF ST. LOUIS, MISSOURI.

PARING AND SLICING KNIFE.

SPECIFICATION forming part of Letters Patent No. 645,447, dated March 13, 1900.

Application filed September 29, 1898. Renewed October 16, 1899. Serial No. 733,826. (No model.)

*To all whom it may concern:*

Be it known that I, JAMES W. ALLEN, of the city of St. Louis, State of Missouri, have invented certain new and useful Improvements in Paring and Slicing Knives, of which the following is a full, clear, and exact description, reference being had to the accompanying drawings, forming a part hereof.

My invention relates to paring and slicing knives; and it consists of the novel construction, combination, and arrangement of parts hereinafter shown, described, and claimed.

Figure 1 is a plan view of my improved paring and slicing knife, three of its uses being indicated in dotted lines. Fig. 2 is a longitudinal section taken approximately on the line 2 2 of Fig. 1, another one of its uses being indicated in dotted lines. Fig. 3 is a side elevation taken looking in the direction indicated by the arrow 2 in Fig. 1 and illustrating the use of the device. Fig. 4 is a transverse section taken approximately on the line 4 4 of Fig. 1.

Referring by numerals to the drawings, the gage-plate 5 is square or rectangular in plan and is constructed of sheet metal, preferably steel. The flat blade 6 projects from the right-hand side of the plate 5, and the edge 7 of said blade is beveled and sharpened. The curved blade 8 projects from the opposite side of the plate 5 from the blade 6, and the edge 9 of said blade is beveled and sharpened.

The handle is formed of wire and consists of the central portion 10, which is bent substantially to a semicircle; the portions 11 and 12, which extend from the ends of the portion 10 in lines nearly parallel; the portions 13 and 14, which extend in the form of compound curves outwardly from the ends of the portions 11 and 12; the portions 15 and 16, which extend from the outer ends of the portions 13 and 14 in parallel lines, and the portions 17 and 18, which extend from the free ends of the portions 15 and 16 at angles of approximately forty-five degrees and in lines parallel with each other. Portions of the material which are cut from opposite sides of the blade 6 are rolled around the portion 16 of the handle, thus forming the bearings 19 and 20, and indentations 21 are formed in said bearings with a chisel, said indentations causing the material of the bearings to firmly grip the wire. Portions of the material which are cut from the side of the blade 8 are rolled around the portion 15, thus forming the bearings 22 and 23, and the indentations 25 are formed in said bearings by the use of a chisel. The bearings 19 and 20 and 22 and 23 secure the plate 5 and the blades 6 and 8 to the handle.

The plate 26 is mounted at an angle of approximately forty-five degrees relative to the plate 5, and its ends are rolled around the portions 17 and 18, respectively, thus forming the bearings 27 and 28, and the indentations 29 are formed in said bearings with a chisel to cause the bearings to grip the wire and thus hold the plate firmly in position. The edge 30 of the plate 26 is beveled and sharpened and is set a slight distance from the edge of the plate 5. The portion 31 of the plate 26 projects upwardly and outwardly from the center of said plate, and its free edges are beveled and sharpened, thus producing a diamond-pointed cutter.

In the practical operation of my improved paring and slicing knife if it is desired to pare a potato or the like the rear side of the plate 5 is placed against the potato 32, (indicated in dotted lines,) and by drawing the device in the direction indicated by the arrow 33 the edge 30 will engage the potato and remove the peeling 34. If it is desired to remove the eye, as indicated by 35 in Fig. 1, the diamond-pointed cutter 31 is employed. If it is desired to quarter the potato, as indicated by 36 in Fig. 1, the blade 6 is employed. If it is desired to cut the potato into strips or Saratoga chips, as indicated by 37 in Figs. 1 and 4, the blade 8 is employed. If it is desired to slice the potato, as indicated by 38 in Fig. 3, the handle is elevated within the limits of the space 39 between the edge 30 and the plate 5. The more the handle is elevated the thicker the slice 40 will be, and vice versa. In a like manner the device may be employed in paring and slicing other vegetables, and it is especially useful in slicing cabbage.

I claim—

In a device of the class described, the plate 5, the flat blade 6 projecting from one side of said plate 5 and having the edge 7, the curved blade 8 projecting from the opposite side of said plate 5 and having the edge 9, a suitable handle attached to said plate, the plate 26 mounted at an angle relative to said plate 5 and having the edges 30 near one edge of said plate 5 and forming the space 39 between the plate 5 and the plate 26, substantially as specified.

In testimony whereof I affix my signature in presence of two witnesses.

JAMES W. ALLEN.

Witnesses:
ALBERT J. MCCAULEY,
JOHN C. HIGDON.